May 24, 1927.
M. J. MILLER
BABY CHAIR FOR AUTOMOBILES
Filed April 8, 1925
1,629,834
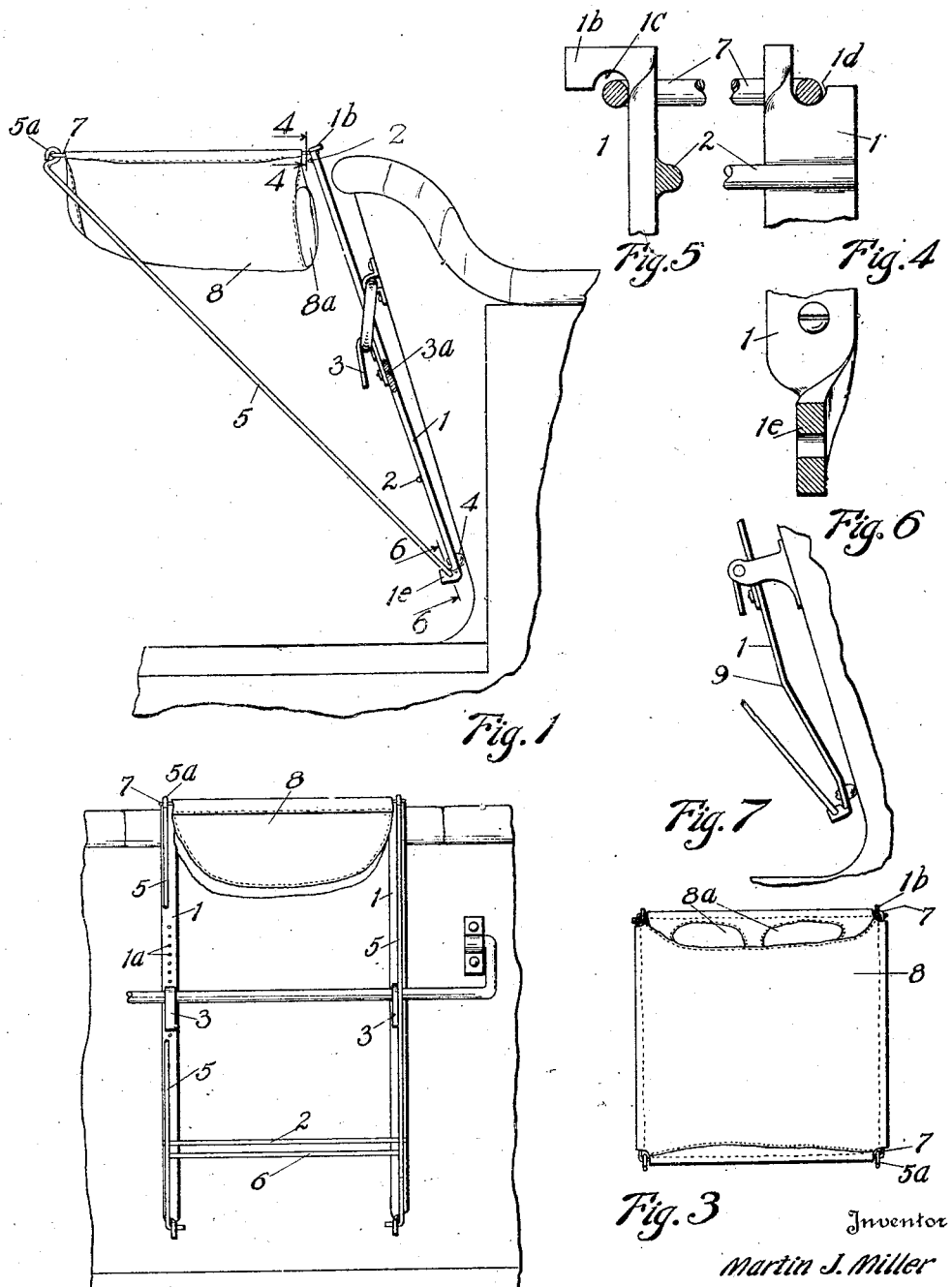
Inventor
Martin J. Miller
By A. B. Bowman
Attorney

Patented May 24, 1927.

1,629,834

UNITED STATES PATENT OFFICE.

MARTIN J. MILLER, OF ALHAMBRA, CALIFORNIA.

BABY CHAIR FOR AUTOMOBILES.

Application filed April 8, 1925. Serial No. 21,459.

My invention relates to a chair structure for babies to be supported in an automobile and the objects of my invention are:

First, to provide a collapsible structure which is supported on the robe rail on the back of the front seat of an automobile, in which a baby can ride safely without being thrown out and not subjected to jars from the automobile. Second, to provide an apparatus of this class which is applicable in connection with robe rails of different classes on the back of the front seat of automobiles. Third, to provide an apparatus of this class which may be readily detached from the robe rail when not in use. Fourth, to provide an apparatus of this class which may be folded up into very compact form when not in use and fifth, to provide an apparatus of this class which is very simple and economical of construction, durable, easy to install or remove from the automobile, flexible, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims reference being had to the accompanying drawings and to the characters of reference thereon which form a part of this application, in which:

Figure 1 is a side elevational view of my chair shown positioned on the back of the front seat of an automobile which is shown diagrammatically. Fig. 2 is a rear elevational view thereof. Fig. 3 is a top or plan view of the chair alone. Fig. 4 is a sectional view on an enlarged scale through 4—4 of Fig. 1. Fig. 5 is a side elevational and sectional view of the detailed connection shown in Fig. 4. Fig. 6 is a sectional view on an enlarged scale through 6—6 of Fig. 1 and Fig. 7 is a fragmentary side elevational view of the supporting mechanism in a slightly modified form showing it applied to a robe rail that is stationary showing the back of the seat and robe rail diagrammatically.

Similar characters of reference refer to similar parts and portions throughout the views of the drawings.

The main supports 1, connecting rods 2, hook members 3, cushion members 4, brace supports 5, connecting rod 6, seat frame 7, and seat member 8 constitute the principal parts and portions of my baby chair for automobiles.

The main supporting members 1 are preferably made of flat bars and provided with a plurality of holes $1^a$ intermediate their ends in which are mounted bolts $3^a$ which are adapted to extend into holes in the hook members 3, shown best in Fig. 1 of the drawings. These hook members are preferably made in the shape of an inverted U and are of the proper size to fit over the robe rail on the back of the front seat of the automobile and the holes $1^a$ provide for adjustment for positioning the seat 8 the proper height. These bars are supported in spaced relation to each other by means of the cross rods 2 which are secured to said bars at its opposite ends. The upper ends of the bars 1 are provided with forward right angled turns $1^b$, shown best in Figs. 1 and 5 of the drawings, which are provided with a circular recess $1^c$ adapted for the frame 7 of the seat to rest in as shown best in Fig. 5 of the drawings. The upper ends of these bars adjacent the portion $1^b$ and centrally therein, are provided with curved portions $1^d$ adapted for the frame 7 to rest in, as shown best in Fig. 4 of the drawings. The frame 7 is rectangular shaped and supports the upper edge of the seat 8 which is preferably composed of canvas in pocket form and provided with leg holes $8^a$ near the front side. The rear side of the frame 7 is supported by means of the brace rods 5 which are provided with eye portions $5^a$ positioned around the frame 7 at the back side. These members 5 extend downwardly on an angle and are pivotally connected to the lower ends of the bars 1 by means of holes in the right angle turns $1^e$ on the lower ends of said bars, shown best in Fig. 6 of the drawings. Secured on the one side of the bars 1 near the lower ends are cushion members 4 which are preferably rubber and are adapted to engage the back side of the front seat to prevent rubbing or scraping the paint on the back of the seat. The brace rods 5 are secured together near their lower ends by means of the connecting rod 6 to which they are secured at its opposite ends.

In the modified form of construction, shown in Fig. 7 of the drawings, the structure is the same throughout except that the bars 1 are provided with angular turns 9 between the robe rail hook and the lower ends.

In removing the chair from the automobile, the portion 1ᵇ is pressed toward the canvas portion of the seat 8 until the ends of the portion 1ᵇ pass the inside of the frame when the front side of the frame 7 may be raised relatively to the bars 1 at the upper ends. The whole device is then raised until the hooks 3 are unhooked from the robe rail and the bars 1 can be turned down between the main portion of the robe rail and the back of the seat and be removed. The frame 7 together with the seat portion 8 will rest in approximate alinement with the supports 5 and the bars will likewise rest in alinement therewith.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent, is:

1. In a baby chair for automobiles, a pair of bars secured in spaced relation to each other, hook members secured on the normally back sides intermediate the ends of said bars, brace members pivotally connected at the normally lower ends of said bars and a flexible seat member provided with a frame at its upper edge readily and detachably connected at one side by said bars at their upper ends and at its other side pivotally connected to said braces.

2. In a baby chair for automobiles, a pair of bars positioned in spaced relation to each other provided with integral right angled extending portions on one side at one end and with integral right angled extending portions at their opposite ends on their opposite sides, a rigid metallic seat frame readily and detachably connected to the one ends of said bars, hook members adjustably mounted on the one side of said bars intermediate their ends adapted to engage the robe rail of the automobile and brace members pivotally mounted in the right angled turn portions of said bars at their normally lower ends provided with eye members at their upper ends extending around said rigid metallic frame.

3. In a baby chair for automobiles, a pair of bars positioned in spaced relation to each other provided with integral right angled extending portions on one side at one end and with integral right angled extending portions at their opposite ends on their opposite sides, a rigid metallic frame quickly and detachably supported by the one ends of said bars, hook members adjustably mounted on the one side of said bars adapted to engage the robe rail of the automobile, brace members pivotally mounted in the right angled turn portions of said bars at their normally lower ends provided with eye members at their upper ends extending over said rigid metallic frame and a flexible seat member supported by said rigid metallic frame.

In testimony whereof, I have hereunto set my hand at Los Angeles, California, this 28th day of March 1925.

MARTIN J. MILLER.